Figure 1:
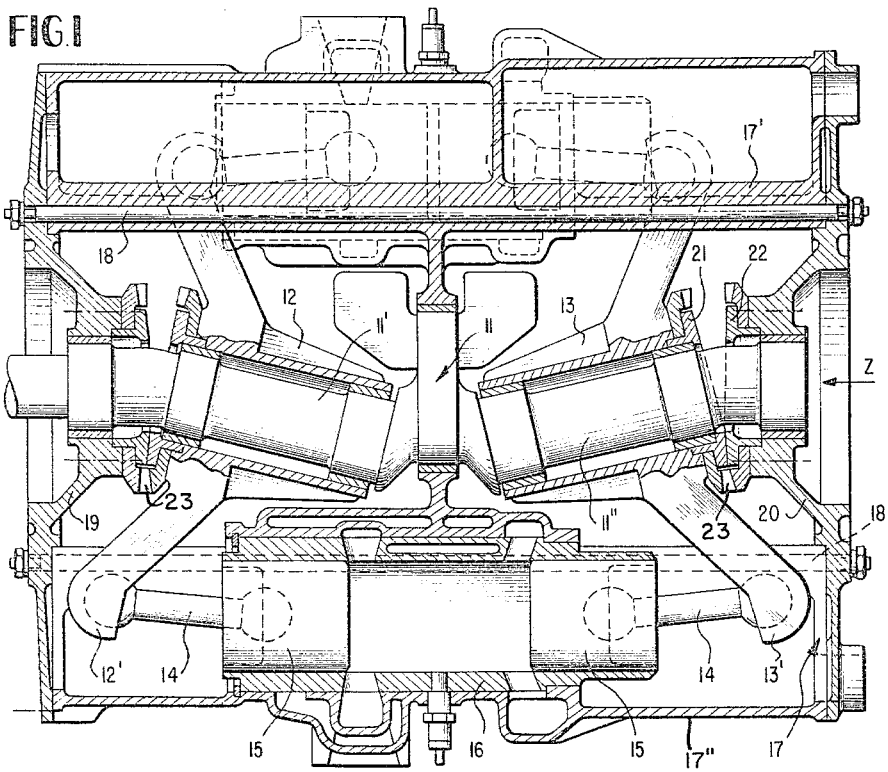

March 15, 1966 R. FREITAG 3,240,127
MULTI-PISTON INTERNAL COMBUSTION ENGINE
Filed Nov. 6, 1963 2 Sheets-Sheet 1

INVENTOR.
REINHOLD FREITAG
BY *Dicke + Craig*
ATTORNEYS

March 15, 1966 R. FREITAG 3,240,127
MULTI-PISTON INTERNAL COMBUSTION ENGINE
Filed Nov. 6, 1963 2 Sheets-Sheet 2

INVENTOR.
REINHOLD FREITAG
BY
ATTORNEYS

United States Patent Office 3,240,127
Patented Mar. 15, 1966

3,240,127
MULTI-PISTON INTERNAL COMBUSTION
ENGINE
Reinhold Freitag, Stuttgart-Unterturkheim, Germany, assignor to Daimler-Benz Aktiengesellschaft, Stuttgart-Unterturkheim, Germany
Filed Nov. 6, 1963, Ser. No. 321,730
Claims priority, application Germany, Nov. 10, 1962,
D 40,253
1 Claim. (Cl. 92—70)

The present invention relates to a multi-cylinder internal combustion engine in which the pistons sliding within the working cylinders act against one swash body or, in case of opposed-piston operation of the engine, against two swash bodies which are rotatably arranged on a cranked transmission shaft.

In connection with multi-cylinder internal combustion piston engines with swash plate drives, it is known in the prior art to brace or support the occurring high axial forces by way of a circular ring-shaped pressure surface provided at the outer end face of the swash disk against a pressure piece rigidly connected with a housing part. For purposes of absorbing the very high axial pressures, it is necessary to construct the frame of the engine housing very sturdily and in particular to reinforce by means of a multi-wall arrangement the housing part which is directly subjected to these forces. These measures lead in a disadvantageous manner to a heavy and expensive housing construction in which the housing part which serves for purposes of support of the engine shaft and for the direct support of the axial pressures has to be rigidly connected by a number of screws or bolts with the remainder of the engine housing.

The present invention is concerned with the aim to create installations and to propose measures which are suited to relieve the engine housing in a most far reaching manner from the high axial pressures and/or which serve to absorb these pressures in a more favorable manner.

As solution of the problem, it is proposed in accordance with the present invention to construct the swash body or swash bodies in a star-shaped manner with bearings, provided at the prong ends, for the pivotal connection of the outer ends of the push rods and simultaneously to pass between the individual star prongs, and more particularly in a respective prong bottom, tie rods extending through the engine housing in the longitudinal direction which clamp together the housing parts provided for the outer bearing support of the engine shaft and for the axial support of the swash bodies with the remainder of the engine housing.

There is achieved by the star-shaped configuration of the swash body in accordance with the present invention that tie rods can be installed for the absorption of these forces as close as possible to the engagement area of the high axial pressures so that in particular also the housing parts which absorb directly the axial pressures and which serve as outer bearings for the cranked engine shaft, can be constructed as simple structural parts. Furthermore, the present invention entails the advantage that by reason of the shorter lever arm reduced in the radial direction between the point of engagement of the axial pressures and the tie rods and by reason of the reduced bending moment resulting therefrom, the possibility may still be realized to utilize the tie rods at the same time for the connection precisely of those housing parts, which are provided for the outer bearing support of the engine shaft and for the support of the axial forces, with the remainder of the engine housing so that the usual securing screws or bolts used heretofore may be dispensed with. A further advantage of the present invention resides in the fact that the inertia forces can be reduced by reason of the star-shaped construction of the swash body.

Accordingly, it is an object of the present invention to provide multi-cylinder internal combustion engines, particularly those in which the pistons act on the engine shaft by way of a swash plate, which eliminate the drawbacks and shortcomings of the prior art constructions, especially as regards the absorption of the high axial forces, in an extremely reliable manner and by extremely simple means.

It is another object of the present invention to provide a multi-cylinder internal combustion engine in which the axial pressures transmitted from the pistons to a swash plate may be readily absorbed without complicated structures and special housing parts.

Still a further object of the present invention resides in the provision of a multi-cylinder internal combustion engine provided with a swash plate drive in which the axial forces can be readily absorbed without bulky multi-wall reinforcements.

A still further object of the present invention resides in the provision of a housing construction for multi-cylinder internal combustion engines having a swash plate drive in which the interconnection and securing of the various housing parts may be realized in an extremely simple manner.

Another object of the present invention resides in the provision of a multi-cylinder internal combustion engine with a swash plate drive in which the engine housing is relieved in a far-reaching manner from the axial pressure forces and which is so constructed and arranged as to absorb more favorably the axial forces that may occur.

A further object of the present invention resides in the provision of a multi-cylinder internal combustion engine with swash plate drive which is capable of absorbing the high axial pressure forces occurring therein, yet permits a reduction of the weight and therewith of the inertia forces of the housing.

Figure 3:
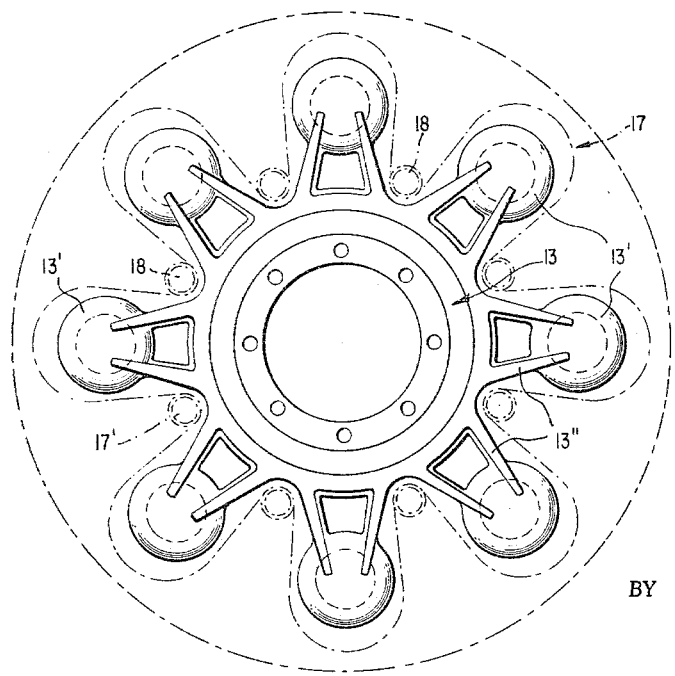
Figure 2:
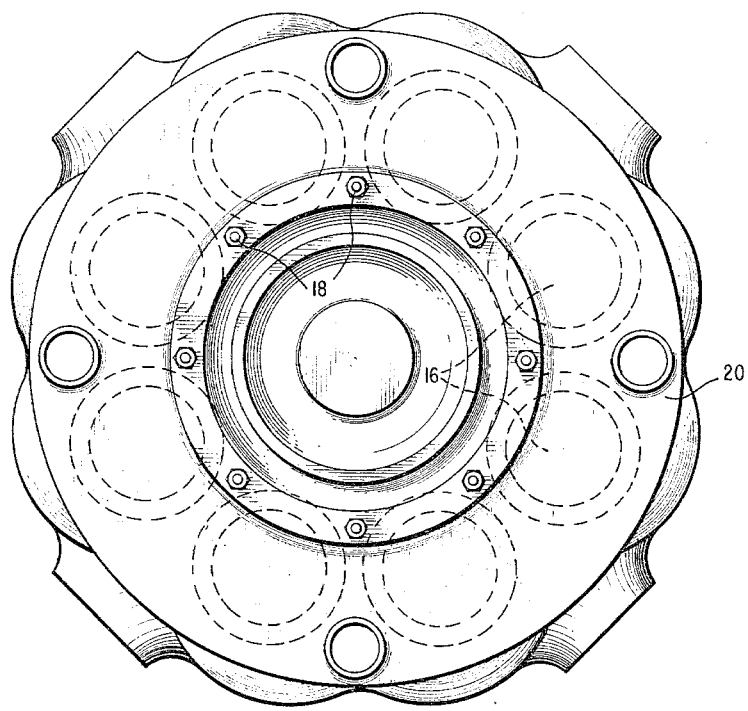

These and other objects, features and advantages of the present invention will become more obvious from the following description when taken in connection with the accompanying drawing which shows, for purposes of illustration only, one embodiment in accordance with the present invention, and wherein FIGURE 1 is an axial longitudinal cross sectional view through the transmission shaft of an internal combustion engine in accordance with the present invention;

FIGURE 2 is an end elevational view of the internal combustion engine taken in the direction of arrow Z of FIGURE 1; and FIGURE 3 is an elevational view of a swash body indicating the location of the tie rods and of the engine housing.

Referring now to the drawing wherein like reference numerals are used throughout the various views to designate like parts, and more particularly to FIGURE 1, reference numeral 11 generally designates therein the transmission shaft which is provided with cranked portions 11' and 11". One swash body or swash plate generally designated by reference numerals 12 and 13 is each rotatably supported on a respective cranked portion 11' and 11". The swash bodies 12 and 13 are, as shown in particular in FIGURE 3, constructed of star-shape. The outer ends of the individual star prongs are constructed as bearings 12' and 13', respectively, for the outer ends of the push-rods 14, the inner ends of which are pivotally connected to the pistons 15. The pistons 15 reciprocate in opposite directions within the working cylinder 16. The rods 18 pass through the engine housing generally designated by reference numeral 17 for the absorption of the high axial forces that occur during operation. The tie rods 18 extend between the individual star prongs 12" and 13" of the two swash bodies 12 and 13 where the engine housing 17 is also provided with radially inwardly directed ribs 17' for the accommodation of these tie rods 18. The housing parts 19 and 20 are simultaneously secured by means of the tie rods 18 to the main housing body 17" of the engine housing 17 and serve both for the support of the transmission shaft 11 as well as for the direct support or bracing of the axial forces. The axial forces are transmitted by pressure pieces 21 and 22 of any conventional construction. Toothed arrangements 23 prevent a rotation of the swash bodies 12 and 13 about the longitudinal axis thereof.

While I have shown and described one embodiment in accordance with the present invention, it is understood that the same is not limited thereto, but is susceptible of numerous changes and modifications within the spirit and scope thereof as known to a person skilled in the art, and I therefore do not wish to be limited to the details shown and described herein, but intend to cover all such changes and modifications as are encompassed by the scope of the appended claim.

I claim:

A multi-cylinder internal combustion engine comprising a plurality of cylinders and opposed pistons reciprocating within said cylinders and push rods connected to said pistons,
- housing means supporting said cylinders, including a main housing body,
- a shaft extending lengthwise through said housing means,
- said shaft having a crank portion,
- two swash plates mounted on said cranked portion,
- each of said swash plates being of star-shaped construction including individual star prongs having base portions and outer end portions, said outer end portions being connected with said push rods,
- said housing means further comprising end parts including bearing means supporting said shaft,
- tie rods extending through said main housing body and said end parts and simultaneously securing said end parts to said main housing body,
- said main housing body comprising radially inwardly directed ribs having radially inner-terminal portions extending longitudinally of said main housing body and closely embracing said tie rods throughout substantially the entire length of the latter,
- said tie rods being disposed intermediate mutually adjacent ones of said base portions.

References Cited by the Examiner
UNITED STATES PATENTS

| | | | |
|---|---|---|---|
| 1,808,664 | 6/1931 | Koschka | 123—58 |
| 2,229,246 | 1/1941 | Istad | 123—58 |
| 2,583,564 | 1/1952 | Hall | 123—58 |
| 3,006,324 | 10/1961 | Shaw | 123—58 |

SAMUEL LEVINE, *Primary Examiner.*

RICHARD B. WILKINSON, *Examiner.*